US009674031B2

(12) United States Patent
Brown et al.

(10) Patent No.: US 9,674,031 B2
(45) Date of Patent: Jun. 6, 2017

(54) AUTOMATED MANAGEMENT OF A DISTRIBUTED COMPUTING SYSTEM

(71) Applicant: LinkedIn Corporation, Mountain View, CA (US)

(72) Inventors: Michael Casey Brown, San Francisco, CA (US); Sylvain Kalache, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 171 days.

(21) Appl. No.: 14/185,537

(22) Filed: Feb. 20, 2014

(65) Prior Publication Data
US 2015/0236896 A1    Aug. 20, 2015

(51) Int. Cl.
| G06F 15/16 | (2006.01) |
| H04L 12/24 | (2006.01) |
| H04L 29/08 | (2006.01) |
| H04L 12/26 | (2006.01) |

(52) U.S. Cl.
CPC .......... *H04L 41/0654* (2013.01); *H04L 43/08* (2013.01); *H04L 43/16* (2013.01); *H04L 67/10* (2013.01)

(58) Field of Classification Search
CPC ..... H04L 67/10; H04L 41/0654; H04L 43/06; H04L 43/16; G06F 11/3409
See application file for complete search history.

(56) References Cited

U.S. PATENT DOCUMENTS

| 9,106,676 | B1 * | 8/2015 | Hucik | H04L 67/1097 |
| 2004/0243706 | A1 * | 12/2004 | Rosenbach | G06F 9/5088 |
| | | | | 709/225 |
| 2008/0005782 | A1 * | 1/2008 | Aziz | G06F 9/45537 |
| | | | | 726/3 |
| 2013/0198319 | A1 * | 8/2013 | Shen | G06F 9/455 |
| | | | | 709/217 |
| 2013/0297802 | A1 * | 11/2013 | Laribi | H04L 47/80 |
| | | | | 709/226 |
| 2014/0282434 | A1 * | 9/2014 | Eilam | G06F 11/3672 |
| | | | | 717/131 |

* cited by examiner

*Primary Examiner* — Liangche A Wang
*Assistant Examiner* — Ayele Woldemariam
(74) *Attorney, Agent, or Firm* — Park, Vaughan, Fleming & Dowler LLP

(57) ABSTRACT

A system, method and computer program product are provided for managing a distributed computing system that features multiple hosts executing a distributed application. On each host a collector process collects application-level and/or system-level metrics and reports them to a data repository. A controller executes actor processes that compare the metrics, and/or trends in the metrics, to predetermined thresholds. If a threshold is met or passed, the corresponding actor or the controller initiates one or more remedy processes that take action intended to alleviate the condition detected by the actor. When a remedy is triggered, the controller takes a snapshot of the system to identify the current state, and saves information indicating how well the executed remedies corrected the situation. When a new snapshot matches an existing snapshot, the controller uses the saved information to determine which remedies to apply to the present occurrence of the mutual state.

20 Claims, 4 Drawing Sheets

AUTOMATED MANAGEMENT OF A DISTRIBUTED COMPUTING SYSTEM

BACKGROUND

A system, method and computer program product are provided for monitoring and maintaining a distributed computing system.

Distributed computing systems include multiple hosts (e.g., application servers) that execute one or more common applications for access by remote users. Whether the hosts are separate computer servers, individual virtual machines or some other combination of distinct hardware and/or software resources, managing the hosts and the applications can be difficult.

For example, when the number of hosts reach into the hundreds, the potential for problems increases commensurately. Such problems may involve diminishing resources (e.g., storage space, memory, communication bandwidth), conflicts between different processes for hardware and/or software resources, etc.

Simple monitoring tools generally allow monitoring of individual resources (e.g., disk space), but often do not support monitoring of specific application-level processes or activity, and especially not across tens or hundreds of hosts. Further, the information reported by such tools is generally limited to specific resource statuses, and does not provide a glimpse into the state or status of the overall distributed system. Therefore, if a resource constraint detected by a traditional monitoring tool is actually being caused by some other condition, the tool may not be able to recognize that, and may not provide enough information to allow a human operator or administrator to determine the underlying problem.

Yet further, traditional monitoring tools stop at monitoring and collecting information. They do not attempt to intelligently apply possible solutions to correct a problem. Other tools that may be capable of taking remedial action in some circumstances generally do so in a "dumb" manner—that is, they apply the same action every time a particular circumstance is encountered. Even if the specified action has no effect, but some other action would (or might) solve the problem, the same ineffective process will be applied the next time.

DETAILED DESCRIPTION

The following description is presented to enable any person skilled in the art to make and use the embodiments disclosed herein. Various modifications to the embodiments will be readily apparent to those skilled in the art, and the general principles defined herein may be applied to other embodiments and applications. Thus, the present invention is not intended to be limited to the embodiments shown, but rather is to be accorded the widest scope consistent with the principles and features disclosed herein.

In some embodiments, a distributed computing system is provided, with automated methods of monitoring and managing the system. Monitoring the system may entail examining states of various metrics at the application level and/or system level. Managing the system may include taking remedial action in the event an error or other undesirable condition is detected, such as an abnormal value for an observed metric. Upon detection of an undesirable condition, the system automatically attempts one or more remedies, which may include remedies specifically prescribed for the condition and/or remedies learned from dealing with previous undesirable conditions.

Figure 1:
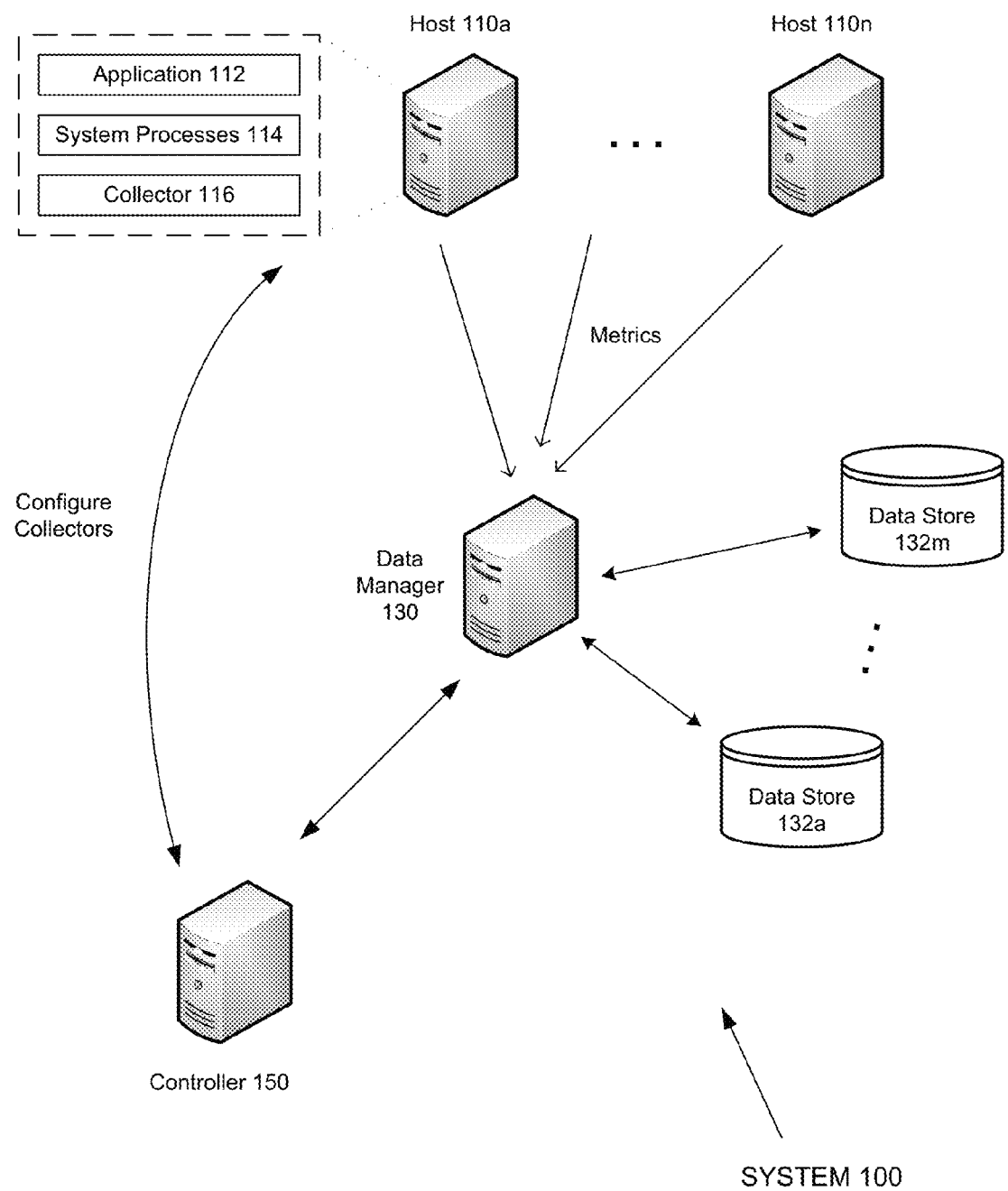
FIG. 1 is a block diagram of a distributed computing system that incorporates automated system management, in accordance with some embodiments.

FIG. 1 is a block diagram of a distributed computing system that features automated system management, according to some embodiments.

System 100 includes multiple hosts 110 (e.g., hosts 110a, 110n), which may be application servers, web servers or other entities capable of receiving user connections. Although depicted as separate computer servers in FIG. 1, in other embodiments each host 110 is a virtual machine, and therefore multiple hosts may be co-located on a single computer server. The number of hosts varies from one implementation to another but may include tens or hundreds in some implementations.

Illustrative host 110a and other computer servers depicted in FIG. 1 include traditional resources such as one or more processors, memory, non-volatile storage (e.g., optical or magnetic disk, solid-state drive), communication interfaces, input components, etc., which are shared among the host's operating system and other software components. For example, in system 100, each host executes application 112, system processes 114 and collector 116.

Application 112 is a distributed application comprising one or more computer-executable processes, and its nature or purpose is not critical to the automated management described herein. Thus, in different implementations, application 112 may provide document processing functionality (e.g., to convert a document from one type to another), user communications (e.g., chat, instant message, electronic mail), professional social networking, gaming, security (e.g., encryption/decryption, anti-malware protection), etc. Hosts may execute more than one distributed application; application 112 is intended to demonstrate that hosts 110 mutually support at least one distributed application.

System processes 114 include operating system processes and/or other processes that specifically support operation of the host on which the processes execute. Thus, the system processes may involve memory management, access to storage components, security, communications, and/or any other task(s) performed by the host beyond the process or processes that execute as application 112 and collector 116.

Collector 116 regularly collects metrics on host 110a and reports them (e.g., to data manager 130). For example, collector 116 may be configured to obtain or measure specific metrics (e.g., amount of free disk space, percentage of utilization of a processor, number of requests for application 112 that were rejected) on a regular or periodic basis. The metrics collected by collector 116 may be application-level metrics (e.g., associated with application 112) and/or system-level metrics (e.g., associated with system processes 114).

In some implementations, a collector includes daemons for collecting system metrics, illustratively written in Ruby, plus a gem for collecting application metrics. In these implementations, a utility or tool such as Fluentd conveys the collected metrics to other system components (e.g., data manager 130).

Data manager 130 is a system component that routes data operations (e.g., reads, writes) to the appropriate data store(s). In particular, the data manager receives metrics from collectors 116 operating on each host 110, stores them in data stores 132 (e.g., data stores 132*a*, 132*m*) and provides access to those metrics and/or other data by other system components (e.g., controller 150). Although depicted as a single entity, data manager 130 may comprise multiple separate components, such as one module for receiving and storing metrics from hosts 110, and another module for receiving and responding to data queries from controller 150 (and/or other sources), which may be co-located or execute on separate hardware resources.

In some implementations, data stores 132 are traditional relational databases (e.g., from Oracle Corporation); in other implementations they are open-source database systems, such as MongoDB® databases that apply dynamic schemas to store host metrics and/or other data in JSON (JavaScript Object Notation) format.

Controller 150 configures and re-configures collectors 116 (e.g., as the application load of hosts 110 changes), queries data manager 130 to examine collected metrics, detects undesirable conditions (e.g., from the stored metrics), takes remedial action when possible, provides interfaces for operators and/or users of the distributed system, and provides additional functionality as described herein.

In some embodiments, the reporting format used to convey metrics from hosts 110 to data manager 130 is semi-structured, meaning that rather than using a rigid structure limited to identifying a metric and its corresponding value, for example, other information (e.g., metadata) may be reported. The metadata that is included may be configured by or via controller 150, and cause the hosts' collectors to report other information related to the specific metric being reported.

As indicated above, at data manager 130, the metrics and other information reported by the hosts may be stored in JSON format to enhance the flexibility of the system and allow it to adapt as the applications supported by the system hosts change (e.g., to add or remove an application, to reconfigure an application).

In some implementations, a metric reported by a collector for its host, and logged by data manager 130, may identify the metric and the host, identify a process associated with the metric (e.g., an application, a system process), provide a timestamp, include a set of data associated with the metric (e.g., a document file name or other identifier), report a duration of an event corresponding to the metric (e.g., conversion of the document from one format to another), etc. Some specific metrics could include additional metric-specific information in a free or fixed format, depending on the application or system process associated with the metric, for example. TABLE 1 identifies some application-level and system-level metrics that may be collected in an illustrative embodiment; other embodiments are not limited to the metrics identified in the Table.

TABLE 1

| Metric | Description |
| --- | --- |
| System Memory | Amount or percentage of host memory available (or in use) |

TABLE 1-continued

| Metric | Description |
| --- | --- |
| CPU Usage | Percentage utilization of host processor(s) |
| Disk Usage | Amount or percentage of storage space available (or in use) |
| I/O Load | Percentage utilization of an I/O resource |
| Current Processes | Number of processes currently executing on host |
| Code Version | Version of code running for a specified process |
| Message Size | Amount of data contained in a message (e.g., for auditing) |
| Application Error Rate | Rate with which the application issues errors |
| Application Rate of Processing Messages | Rate with which the application processes service requests |
| Job Duration | Duration of a job or task performed by the application |
| Qualify Confidence Score | A score indicating the confidence that the application completed a job with required or minimal quality |
| Application Error Log | Full stack traces from an application error |
| Critical Path Event | A specific error generated in a push fashion rather than a pull (e.g., such as an application error log) |

An illustrative but non-exhaustive list of other system/application metrics that may be monitored and/or reported by a collector may include things such as: network configuration (e.g., TCP/IP interface parameters), current load, currently executing processes, how long the host has been up and running, Subversion information (i.e., svn info), number of active Nginx connections or other proxy connections, size of each application job handled (e.g., number of pages in a presentation), scores for each application job (e.g., visual fidelity scores for document conversions), benchmarking data, etc.

When a new application is added to a distributed computing system and installed on the system's hosts, new metrics may be specified and described for capture by collectors 116. In particular, controller 150 will configure the new metrics, identify the information to be logged and reported to the data manager, specify how frequently to collect the metrics, what (if any) metadata to include in the metric logs, etc.

In some embodiments, controller 150 automatically manages system 100 with a collection of processes that monitor the system (e.g., via the reported metrics) and that can trigger specified and/or learned remedial management actions if an undesirable condition is encountered. Controller 150 may provide a dashboard and/or other interfaces that allow operators/administrators of system 100 to view data stored by the data manager, obtain reports regarding system performance and/or status, change parameters of collectors 116 and/or controller 150, etc.

For example, an operator or one of the controller processes could query the data manager to receive all information about application 112 running on host 110*n* for a default or specified period of time. The controller would retrieve the requested data and present it to the requester via an operator interface or a suitable API (Application Programming Interface).

For purposes of automated system management, controller 150 hosts one or more "actor" processes. Each actor process compares one or more specified metrics (reported by one or more hosts) to corresponding thresholds that may demark error situations, conditions that warrant attention, tolerable system fluctuations, etc.

For example, a given actor process may compare a current "free storage space" metric on all hosts to a threshold such as "10%," may compare the current "request failure rate" for a particular application on a specific host to a threshold such as "20%," etc. Any of the various system-level and application-level metrics mentioned herein (and others not delineated herein) may be examined on a specific host, on all hosts or on any desired subset of all hosts.

In an illustrative implementation of system 100 in which application 112 performs document translations (e.g., between a word-processing format such as Word and a presentation format such as PDF (Portable Document Format)), some other metrics that may be monitored include "job failures" (e.g., number of translation jobs that have failed since the previous execution of the associated actor), "number of PDF documents" (e.g., number of documents that have been converted into, or from, the portable document format), "job duration" (e.g., average time needed to finish jobs that were completed since the last report), etc.

Each actor process (or simply "actor") may be programmed to run with a specified frequency (e.g., every 5 minutes, every hour, every two days), and may examine the current value of the specified metric(s) and/or a trend. Thus, the first example actor above may not only determine all hosts' current "free storage space" percentages and compare those percentages to the threshold of 10%, but may also identify a trend. A trend for this metric on a particular host may be something like "decreasing by 2% every 5 minutes" or "increasing by 4% every 12 hours" or "steady" or something similar. The "trend" for a given metric will necessary depend on the metric, but in general may reflect increases and/or decreases over some time period (e.g., over two or more reporting periods), or may reflect a steady state.

In these examples, the thresholds the actors' consider in their operations may indicate statuses or levels of activity at which further (e.g., more extensive) monitoring should be applied, or at which some action should be taken to remedy a situation that reflects a problem with a host or an application, or that may be expected to lead to a problem if not remedied.

Thus, if free storage space (e.g., on a disk drive or solid-state drive) falls below the 10% threshold, some action may be warranted to increase it because the condition might otherwise lead to performance problems if it continues to fall. Or, if the request failure rate of an application instance on a particular host increases beyond the 20% threshold, the host may be experiencing a hardware or software problem beyond simply receiving a large number of requests (e.g., especially if an upward trend is detected or a high failure rate is reported for an extended period of time).

In some embodiments, every application installed on a distributed computing system has one or more associated actor processes executing on the system's controller. Each associated actor associated with an application monitors a unique set of application-level metrics, on one or more hosts. Similarly, one or more actor processes may be configured to examine system-level metrics to monitor host conditions apart from the applications they execute. Each system-level actor may monitor those metrics on one or more hosts.

In some other embodiments, however, a given actor process may encompass both application-level and system-level metrics. Further, actor processes may be organized hierarchically. Thus, a top actor process may be associated with one application executing on all system hosts. That top actor may have multiple child actor processes associated with different aspects of the application and/or different system components and/or processes that may be taxed by the application.

For example, separate child actor processes may be created for monitoring metrics associated with storage space (e.g., free storage space, reads/writes per second), memory (e.g., percentage free (or percentage in use), cache utilization), and processor(s) (e.g., percentage utilized, idle time). Each of these child actors may monitor all metrics related to their resources, or may have further child actor processes that monitor different sets of metrics.

In addition to the actor processes, controller 150 also hosts one or more "remedy" processes. Each remedy process (or simply "remedy") executes a specific action regarding a specified application and/or host. The various remedies are available to the collector for use if and when an undesirable condition is detected (e.g., by an actor).

Some default remedies may be programmed for general applicability across all distributed hosts—such as deleting temporary files, stopping or restarting a process, identifying the process on a host that is consuming the most memory, shutting down a host, etc. Other remedies may be specific to an application or a host—such as cancelling all pending translation jobs in a document translation application, stopping a web application from accepting new connections on a specific host, etc.

A given remedy process may entail multiple discrete actions that, together, accomplish the remedy. For example, a remedy focused on freeing up memory on a host may include actions such as obtaining current memory usage statistics, identifying the process that is using the most memory, determining whether that process is using more memory than usual (e.g., based on historical statistics, based on a trend) and, if so, restarting that process. Also, or instead, remedy processes may be arranged hierarchically, like actor processes. A parent remedy may thus involve triggering one or more children to perform discrete actions.

Figure 2:
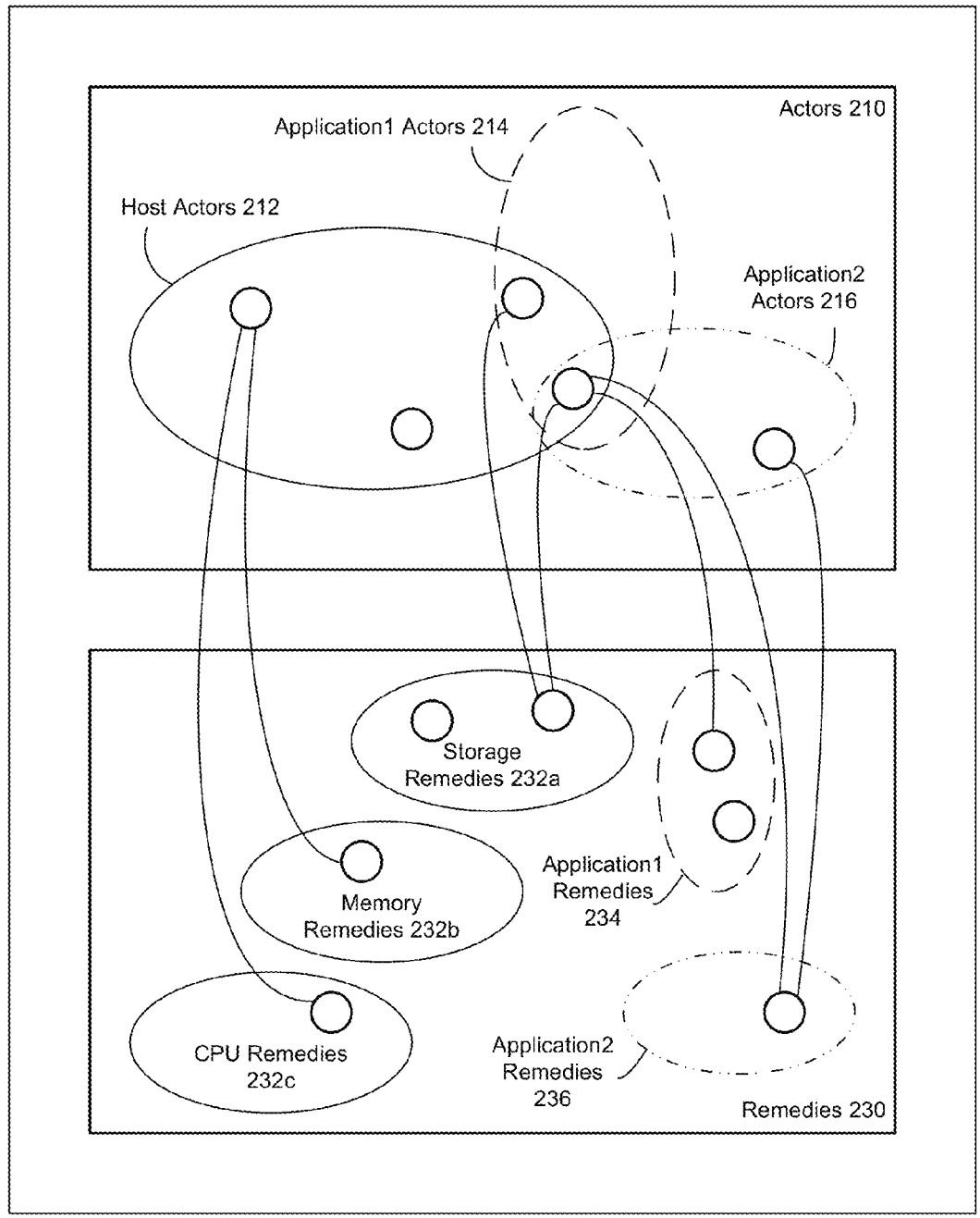
FIG. 2 is a block diagram of a controller for performing automated management of a distributed computing system, in accordance with some embodiments.

FIG. 2 is a block diagram of a controller for performing automated management of a distributed computing system, according to some embodiments. The diagram of controller 250 illustrates various actors 210 and remedies 230 the controller uses to automatically monitor and manage a distributed computing system.

Actors 210 include multiple families, such as host actors 212, application1 actors 214 and application2 actors 216. In the illustrated embodiments, host actors 212 include actors that monitor system-level metrics on hosts. Application1 actors 214 include actors for monitoring application-level metrics of a first application, and Application2 actors include actors for monitoring application-level metrics of a second application.

Remedies 230 similarly include multiple families of remedies, including storage remedies 232a, memory remedies 232b and CPU remedies 232c for applying remedies related to storage conditions, memory conditions, and processor conditions, respectively. Similarly, Application1 remedies 234 and Application2 remedies 236 include remedies specific to Application1 and Application2, respectively.

As indicated by connections between actors and remedies, a given actor may call upon different remedies, and a given remedy may be applied by different actors.

Thus, the actor and remedy processes maintained by controller 150 of system 100 of FIG. 1 allow it to not only detect undesirable conditions, but also to try to eliminate or alleviate the condition. The former is achieved by actors that execute on regular or scheduled bases; the latter is accomplished by execution of one or more remedies.

The controller's ability to rectify undesirable conditions is enhanced by an ability to learn which remedies are most effective in particular circumstances. In some embodiments, each time the controller applies a remedy in response to an actor's detection of an undesirable condition, the controller determines whether the remedy alleviated the problem, had no effect, or made the situation worse. To determine the effect of a remedy, after applying it the controller may re-apply the same actor that detected the condition (and/or others), which will indicate whether the metric or metrics that indicated the condition improved, degraded or did not change.

To aid its learning process, the system controller takes a snapshot of the system whenever it determines it must take some action (i.e., apply a remedy process), in order to capture its state at that time. The snapshot may encompass any or all of the metrics gathered by the host collectors and stored by the data manager—such as all metrics on a single host that has exhibited the problem, just the metrics associated with a particular storage device on one host, all metrics associated with a particular application, all communication-related metrics across all hosts, etc. The particular set of metrics incorporated in a given snapshot may depend on the actor process that detected the undesirable condition that requires the snapshot, or the same metrics may be used every time. A snapshot may be hashed to reduce its footprint.

Thus, each time an undesirable condition is detected, a snapshot of the system state is saved and then one or more remedies are executed. In some implementations, the result of the remedial action may be recorded as or with a new snapshot that, together with the snapshot of the system taken when the condition was detected, reveal the system's states before and after the remedy executed. Alternatively, the "after" condition that is stored may comprise values for one or more metrics, as they were after the remedy or remedies.

The snapshots of the system that capture undesirable conditions are used to determine, the next time those conditions are encountered, which remedy or remedies to apply. In particular, each time the controller takes a snapshot after an actor detects a problem, the controller determines whether the new snapshot matches any previous snapshots. If so, it can then review the remedy or remedies that were attempted for those earlier states, and their results, to determine which was effective (or most effective, if more than one were effective at different times). The remedies associated with a given system state may be sorted so that the most effective ones are identified first. Over time, remedies that did not have salutary effects on the undesirable condition will be discarded, while those that are effective become weighted more heavily.

To illustrate the benefit of retaining system snapshots and the effects of different remedies, consider different system states that exhibit identical problematic symptoms. For example, if the system takes a snapshot every time an application metric such as the number or rate of application requests that are rejected hits a threshold, the system will be able to differentiate between times when that condition is encountered along with an extremely high number of application requests and times when a host storage device is at or near capacity. Different remedies will be appropriate and effective for these two states, and the system will learn that over time.

Figure 3:
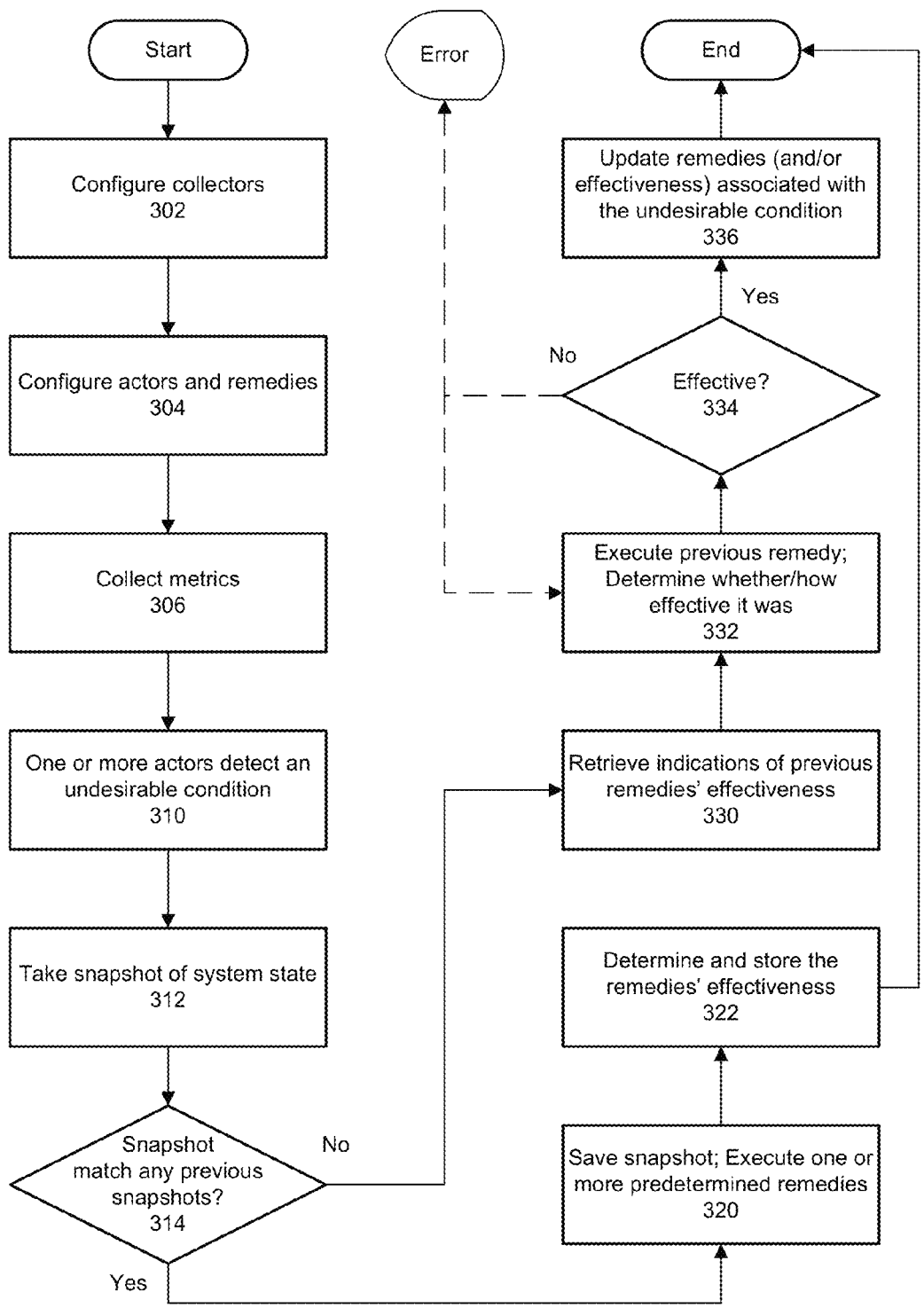
FIG. 3 is a flow chart illustrating a method of automated management of a distributed computing system, in accordance with some embodiments.

FIG. 3 is a flow chart illustrating a method of automated management of a distributed computing system, according to some embodiments.

In operation 302, collectors are installed and configured on each of the system's hosts. The collectors may be configured identically, if the hosts and their loads are identical, or they may differ. The collectors may be configured by a system controller or other system component.

In operation 304, the controller is operated to configure a set of actor processes for monitoring or examining data reported by the collectors, and a set of remedy processes for taking action to eliminate or alleviate undesirable conditions.

As discussed above, each actor may have parameters such as frequency of operation, a list of metrics to examine, values and/or trends to compare to present and/or past metrics, identities or wildcards to determine which host(s)'s metrics to examine, etc. An actor may be configured to capture a system snapshot when warranted, and may also be configured to identify one or more predetermined remedies to initiate (e.g., if a current metric or trend hits a threshold), or may be configured to locate and initiate an effective remedy based on a match between a current system snapshot and a previous snapshot. Alternatively, a controller may be responsible for taking snapshots and reviewing past remedies to select one for a current condition.

Each remedy process may have parameters such as one or more actions to perform, an actor (or other process) to initiate after completing the action(s) (e.g., to re-check the metrics associated with the condition that caused the remedy to be initiated), weights indicating how effective the remedy was for one or more particular conditions that triggered the remedy (or whether the remedy was effective at all), etc. As discussed above, undesirable conditions may be identified and/or recorded as snapshots of the system's state.

An actor may be programmed with specific remedies to initiate if any of its thresholds are triggered, may inherit remedies to try from a parent actor or other higher-level actor, and/or may have one or more remedies associated with it over time if they are found to resolve or alleviate the undesirable condition that the actor detected. Thus, configurations of actors and/or remedies may change over time as different conditions are detected, different remedies are applied, etc.

In operation 306, during operation of the distributed system the hosts' collectors collect and report metrics. If each host is configured similarly in terms of application load and system resources, each collector may report the same metrics and, if the distributed system's load is evenly balanced among the hosts, each collector's reported values may normally be similar.

In operation 310, one (or more) of multiple actor processes that execute on regular bases determine that a metric that it monitors, and or a trend it monitors, has met or exceeded a threshold. Repeating the examples above, a current "free storage space" metric of a specific host may fall below a threshold of concern (e.g., 5%, 10%), or a troubling trend may be exceeded (e.g., "decreasing by 5% every minute), a number or rate of "rejected requests" received by application instances operating on one or more hosts may exceed thresholds of concern or exhibit an undesirable trend, etc.

Upon detection of the undesirable condition by the actor, in operation 312 the actor (or the system controller) captures a snapshot of the system's state. This snapshot may include the metrics that defined or reflected the condition, and/or others. The snapshot may be hashed or otherwise processed to yield a unique or semi-unique identifier. Creation of a snapshot may be one remedy process that the actor or controller is configured to automatically invoke.

An illustrative snapshot will capture not only the metric(s) and the trend(s) that define an undesirable condition (e.g., request failure rate above 20% for 5 minutes, increasing 2% per 5 minutes), but other relevant data as well (e.g., host has been up for 318 hours, free storage space is 14%, page table is 80% full).

In operation 314, the snapshot (or snapshot hash) is compared with other stored snapshots (or hashes), to determine if the same undesirable system state that is currently exhibited was encountered previously. If a match is found, the illustrated method advances to operation 330; otherwise, the method continues with operation 320.

In operation 320, the snapshot (or snapshot hash) is saved, and one or more predetermined remedies are initiated. The predetermined remedies may include remedies specific to the actor that detected the undesirable condition and/or remedies inherited from a parent or higher-level actor.

For example, a root actor process associated with a specific application may have child actors that cover particular features, modules, functionality or other aspects of the application. A root actor process associated with a host may have child actors that cover different host/system resources or types of resources (such as storage, memory, communication bandwidth, etc.). Therefore, in operation 320, a remedy that is executed may be specified as part of the actor that detected the condition, or may be a parameter of a higher-level actor.

Also, however, an actor associated with one type of metrics (e.g., application-level, system-level) may inherit remedies from an actor associated with a different type of metrics. For example, all actors associated with a particular application may inherit from actors associated with the hosts on which the application is executing. Therefore, if application-related remedies fail to resolve a situation, an actor or the controller may attempt one or more system-related remedies that affect the host's computing resources.

Within operation 320, because this is the first encounter with this system state (i.e., as identified by the system snapshot), available remedies may be attempted in a default order. The default order may begin with remedies specified in the actor process that discovered the condition, and work upward toward and through remedies specified in higher level actors; alternatively, remedies may be attempted in the reverse order or in some other order.

In operation 322, as each remedy is implemented, its effectiveness is evaluated and recorded (e.g., at the controller or by a data manager). Illustratively, the actor that detected the condition is re-executed to re-examine the offending metrics, and/or "after" snapshots are captured. A remedy's effectiveness may be stored as a simple indication regarding whether or not the remedy had a beneficial effect, or may indicate a magnitude of its effect (e.g., "free storage space" increased by 8%, "rejected requests" decreased by 10 percentage points).

In some embodiments, remedial action may cease as soon as a re-examination of the offending metrics indicates that they have returned to a "normal" range (e.g., they no longer violate the actor's threshold(s)). In some other embodiments, a series of remedies may be specified and may all be performed before re-checking the metrics and/or stopping remedial action. Thus, in operations 320-322, one or more remedies and their effects are recorded in association with the system snapshot captured in operation 312. After operation 322, the method ends or alternatively returns to operation 306 to continue collecting and examining metrics reported by the hosts' collectors.

In operation 330, the snapshot taken in operation 312 matches a snapshot of a previously encountered undesirable system state. Therefore, stored information regarding the remedies attempted previously is accessed and will be used to determine a course of action (i.e., to identify the remedy or remedies to initiate).

In operation 332, the top-ranked or most heavily weighted remedy (i.e., the remedy that has been most effective for this system state/condition) is executed and the relevant actor (i.e., the actor that discovered the condition) is re-activated.

In operation 334, if the attempted remedy (sufficiently) alleviates the problem, the method advances to operation 336; otherwise, it may either return to operation 332 to identify and try the next-most historically effective remedy. If all previously attempted remedies have been tried without success, one or more remedies identified or specified by the actor, by higher-level actors or by the controller (e.g., as last-resort options) may be tried, if they exist. If there are no other remedies identified or specified by the actor, by higher-level actors or by the controller, the controller may report an error condition to a human operator or administrator of the distributed computing system.

In operation 336, the controller updates the recorded data regarding the system state/condition that was encountered. This may entail adjusting the weights or rankings of the remedies that were tried, adding a new remedy that was newly attempted, discarding a remedy whose rank or weight has fallen to a sufficiently low level, etc. After operation 336, the method ends or alternatively returns to operation 306 to continue collecting and examining metrics reported by the hosts' collectors.

In an illustrative implementation of the method of FIG. 3, a controller detects a lack of free or available computing power within a computing cluster that it monitors, possibly due to loads generated by users of a website hosted by the cluster. Illustrative metrics which would reflect this load include number of nginx connections, system cpu load, memory usage, and disk I/O. As described above, the controller takes a snapshot of the host system (which may reflect the preceding metrics and/or others), and compares it to snapshots of previous error conditions or anomalies.

Depending on whether the snapshot matches or is similar to any previous snapshots, the controller may apply a programmed or learned resolution that involves adding a new server to the cluster, for example, because the current snapshot closely matches a previous snapshot of a system condition that was improved (or resolved) by adding a new server. Adding the new server may require the controller to issue a request to a cloud computing service. The following is an example of a determined remedy.

When the new server is available, the controller would automatically configure it properly (e.g., to match other members of the cluster), and install necessary software to allow the server to take over some of the cluster's work. Finally, the controller would add the server to a load-balancing scheme for distributing requests among cluster members.

If any of the controller's operations fail during application of this solution, the controller may re-try the solution one or more times. If it cannot be completed successfully, the controller would reverse whatever portion of the solution did complete (e.g., to remove the new server from the cluster), and then alert a human operator or manager.

The use of state-specific snapshots will help the distributed computing system recover from undesirable conditions that, while exhibiting similar symptoms (e.g., similar metrics/trends), have different underlying causes. For example, a particular actor may detect at one time a condition in which an application's "request failure rate" exceeds 20% for at least 10 minutes, and at a second time a condition in which the application's request failure rate exceeds 32% for at least 5 minutes.

The system snapshots will differ at these two times, and will reflect not only the difference in the application's request failure rate, but also other attributes and metrics of the system. Because these are treated as two separate states, different favored remedies may develop (assuming each state is repeated) that better resolve the underlying cause. It may turn out, for example, that one of these states reflects monopolization of a host's processor by a system process (e.g., a garbage collection routine), while the other is caused by a lack of storage resources.

Whereas a traditional tool for monitoring metrics might fail to distinguish between the two system states, because they exhibit similar metrics, embodiments of automated system management provided herein will automatically distinguish between them.

Figure 4:
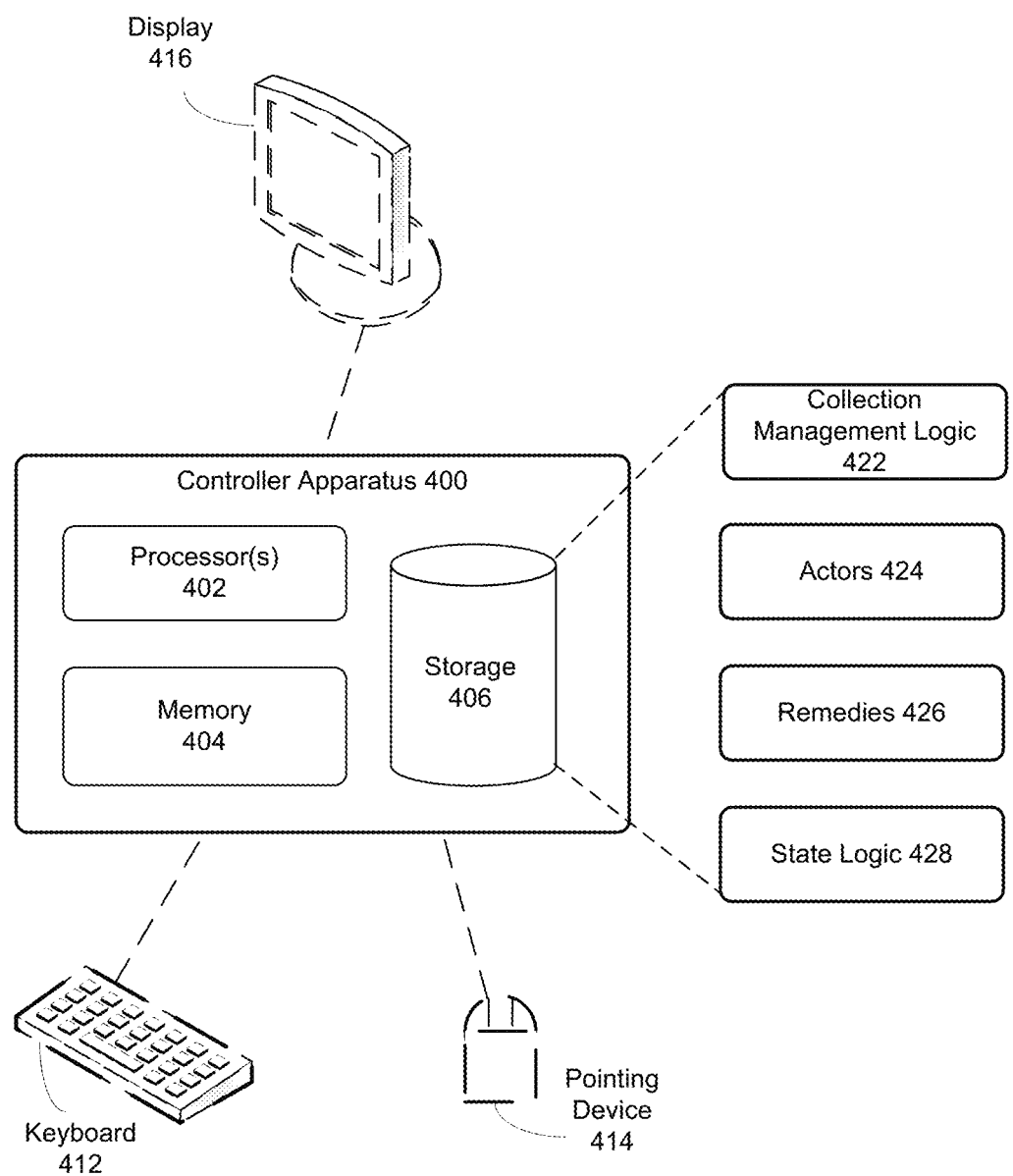
FIG. 4 is a block diagram of an apparatus for performing automated management of a distributed computing system, in accordance with some embodiments.

FIG. 4 is a block diagram of an apparatus for performing automated management of a distributed computing system, according to some embodiments.

Controller apparatus 400 of FIG. 4 comprises processor(s) 402, memory 404 and storage 406, which may comprise one or more optical, solid-state, and/or magnetic storage components. Apparatus 400 may be coupled (permanently or transiently) to keyboard 412, pointing device 414 and display 416. Also, apparatus 400 may be coupled to other components of a distributed computing system, such as hosts that execute supported applications and a data manager for storing system metrics, configuration data, system snapshots and/or other data.

Storage 406 of the apparatus stores system snapshots captured by the apparatus; alternatively, the snapshots may be stored elsewhere. Storage 406 also stores logic that may be loaded into memory 404 for execution by processor(s) 402. Such logic includes collection management logic 422, actors 424, remedies 426 and state logic 428. In other embodiments, any or all of these logic modules or other content may be combined or divided to aggregate or separate their functionality as desired. Apparatus 400 may store additional logic for performing other functions described herein.

Collection management logic 422 comprises processor-executable instructions for configuring and re-configuring collectors that, as described above operate on distributed hosts to collect system and/or application metrics of the hosts and applications executing on the hosts. In some implementations, logic 422 allows apparatus 400 to adjust the collectors whenever a host's configuration changes. The collected metrics are illustratively stored remote from apparatus 400, but in some implementations may be stored locally.

Actors 424 comprise processor-executable instructions for monitoring metrics of the distributed system's hosts. Each actor is configured by apparatus 400 to compare one or more metrics of one or more hosts, and/or trends of those metrics, to corresponding thresholds. Each actor may run on a scheduled or periodic basis, depending on its configuration. If a threshold is encountered, the corresponding actor, or some other logic of apparatus 400, will invoke one or more remedies to attempt to alleviate the condition.

Remedies 426 comprise processor-executable instructions for altering the operation of the distributed system managed by apparatus 400. Each remedy may take one or more actions regarding a supported application (e.g., restart an application instance), a host (e.g., delete temporary files, shutdown) or the system (e.g., activate a new host virtual machine).

State logic 428 comprises processor-executable instructions for capturing the state of the distributed system in a snapshot comprising a set of metrics. State logic (or other logic) may also compare such a snapshot against previous states, retrieve information reflecting actions taken in response to those previous states, updating such information to reflect execution of remedies for the present occurrence, etc.

In some embodiments of the invention, controller apparatus 400 performs most or all of the functions described in relation to controller 150 of system 100 of FIG. 1, and may therefore maintain and execute other logic for initiating actor and/or remedy processes, providing system operators access to metrics, etc.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of automated management of a distributed computing system, the method comprising:
    executing an application program on multiple system hosts;
    collecting and storing metrics from each system host;
    periodically comparing a current value of each metric to a corresponding threshold; and when the current value of a metric crosses the corresponding threshold:
   comparing a snapshot of a present state of the distributed computing system to one or more stored snapshots of previous states of the distributed computing system;
   selecting one or more remedies configured to modify operation of the distributed computing system, the selecting comprising:
      identifying, based on the comparing, one or more remedies for which corresponding snapshots match the snapshot of the present state;
      acquiring remedy effectiveness information associated with the one or more remedies from stored information that includes rankings of effectiveness of remedies that were previously executed in response to previous states of the distributed computing system; and
      selecting the one or more remedies based at least in part on the remedy effectiveness information;
   automatically executing the one or more remedies; and
   based on reexamining the metrics, updating the remedy effectiveness information associated with the one or more remedies.

2. The method of claim 1, further comprising:
configuring each of multiple actors to compare a distinct set of the metrics to their corresponding thresholds.

3. The method of claim 2, wherein said configuring further comprises: configuring each of multiple actors with a schedule of execution.

4. The method of claim 2, wherein said configuring further comprises:
for each of one or more of the actors, identifying a candidate set of remedies to execute on the distributed computing system.

5. The method of claim 1, wherein modifying operation of the distributed computing system comprises changing a workload of a physical resource of one or more system hosts.

6. The method of claim 1, wherein said periodically comparing comprises:
   comparing a current value of a first metric to the corresponding threshold; and
   comparing a current trend of the first metric to a corresponding trend over a predetermined time period.

7. The method of claim 6, further comprising:
if the current trend of the first metric crosses the corresponding trend, automatically executing at least one remedy configured to modify operation of the distributed computing system.

8. The method of claim 1, wherein the effectiveness of a remedy is proportional to the remedy's success in returning the metric to a normal range of values.

9. The method of claim 1, further comprising selecting the one or more remedies that were most effective when executed in response to the previous state.

10. The method of claim 1, further comprising, when one or more remedies for which corresponding snapshots matching the snapshot of the present state are not identified:
   selecting one or more remedies;
   executing the one or more remedies;
   after executing each of the one or more remedies, determining an effectiveness of the remedy; and
   storing the snapshot of the present state with a ranking of effectiveness for the one or more remedies.

11. A non-transitory computer-readable medium storing instructions that, when executed by a processor, cause the processor to perform a method of automated management of a distributed computing system, the method comprising:
   executing an application program on multiple system hosts;
   collecting and storing metrics from each system host;
   periodically comparing a current value of each metric to a corresponding threshold; and
   when the current value of a metric crosses the corresponding threshold:
      comparing a snapshot of a present state of the distributed computing system to one or more stored snapshots of previous states of the distributed computing system;
      selecting one or more remedies configured to modify operation of the distributed computing system, the selecting comprising:
         identifying, based on the comparing, one or more remedies for which corresponding snapshots match the snapshot of the present state;
         acquiring remedy effectiveness information associated with the one or more remedies from stored information that includes rankings of effectiveness of remedies that were previously executed in response to previous states of the distributed computing system; and
         selecting the one or more remedies based at least in part on the remedy effectiveness information;
      automatically executing the one or more remedies; and
      based on reexamining the metrics, updating the remedy effectiveness information associated with the one or more remedies.

12. The non-transitory computer-readable medium of claim 11, wherein the method further comprises, when one or more remedies for which corresponding snapshots matching the snapshot of the present state are not identified:
   selecting one or more remedies;
   executing the one or more remedies;
   after executing each of the one or more remedies, determining an effectiveness of the remedy; and
   storing the snapshot of the present state with a ranking of effectiveness for the one or more remedies.

13. A distributed computing system, comprising: multiple hosts executing a common application;
   a data manager for receiving and storing metrics from the multiple hosts; and
   a controller comprising:
      one or more processors;
      a plurality of actors, each actor configured to compare a current value of a metric to a corresponding threshold;
      multiple remedies, each remedy configured to modify operation of the distributed computing system;
      snapshots of previous states of the distributed computing system, wherein in each previous state the current value of at least one actor's metric crossed the corresponding threshold; and
      for each snapshot, a ranking of effectiveness of at least one remedy executed in response to the previous state, wherein the effectiveness is based on returning the at least one actor's metric to a normal range of values;
   wherein the distributed computing system is configured to select one or more remedies for modifying the operation of the distributed computing system, the selecting comprising:
      identifying, based on a comparison of a snapshot of a present state of the distributed computing system with one or more stored snapshots of previous states of the distributed computing system, one or more remedies for which corresponding snapshots match the snapshot of the present state; and selecting the one or more remedies based at least in part on the ranking of effectiveness; and wherein the distributed computing system is further configured to:

automatically execute the one or more remedies; and based on reexamining the metrics, update the ranking of effectiveness of the one or more remedies.

14. The distributed computing system of claim 13, wherein each actor comprises:
    a schedule of execution;
    at least one metric; and
    for each of the at least one metrics, a corresponding threshold demarking the normal range of values for the metric from an abnormal range of values.

15. The distributed computing system of claim 14, wherein each actor further comprises:
    identities of one or more remedies to invoke if the current value of any of the at least one metrics crosses the corresponding threshold.

16. The distributed computing system of claim 14, wherein each actor further comprises:
    one or more abnormal trends;
    wherein the actor is further configured to compare a current trend of the actor's at least one metric to the one or more abnormal trends.

17. The distributed computing system of claim 13, wherein:
    each of the multiple hosts executes a collector configured to report the metrics of the host to the data manager; and
    the metrics comprise multiple application-level metrics and multiple system-level metrics.

18. The distributed computing system of claim 13, wherein each of the multiple hosts is a virtual machine.

19. The distributed computing system of claim 13, wherein the controller comprises the data manager.

20. The distributed computing system of claim 13, wherein,
    when one or more remedies for which corresponding snapshots matching the snapshot of the present state are not identified, the distributed computing system is further configured to:
    select one or more remedies;
    execute the one or more remedies;
    after executing each of the one or more remedies, determine an effectiveness of the remedy; and
    store the snapshot of the present state with a ranking of effectiveness for the one or more remedies.

* * * * *